United States Patent [19]

Carlson

[11] 4,429,075

[45] Jan. 31, 1984

[54] CROSS-LINKED UREA-FORMALDEHYDE POLYMER MATRIX COMPOSITIONS CONTAINING CYCLIC INTERMEDIATE STRUCTURES

[75] Inventor: John E. Carlson, Statesboro, Ga.

[73] Assignee: Chem-Nuclear Systems, Inc., Columbia, S.C.

[21] Appl. No.: 378,871

[22] Filed: May 17, 1982

[51] Int. Cl.³ .............................................. C08L 61/24
[52] U.S. Cl. ...................................... 524/35; 524/430; 524/431; 524/493; 524/542; 524/598; 525/517; 502/172; 502/208
[58] Field of Search ...................... 525/517, 515, 903; 524/542, 598, 843, 34, 35, 430, 431, 493; 528/260, 259, 245; 523/208; 252/428, 432

[56] References Cited

U.S. PATENT DOCUMENTS

| 3,488,310 | 1/1970 | McCombs | 260/29.3 |
|---|---|---|---|
| 3,816,376 | 6/1974 | Brunnmueller et al. | 260/69 R |
| 3,896,087 | 7/1975 | Brunnmueller et al. | 260/69 R |
| 4,007,142 | 2/1977 | Clarke et al. | 260/2.5 F |
| 4,224,423 | 9/1980 | Ogden et al. | 525/515 |

FOREIGN PATENT DOCUMENTS

| 1570240 | 8/1973 | Fed. Rep. of Germany . |
|---|---|---|
| 54-120659 | 9/1979 | Japan . |
| 55-36231 | 3/1980 | Japan . |
| 55-112227 | 8/1980 | Japan . |
| 403142 | 12/1933 | United Kingdom . |
| 543096 | 2/1942 | United Kingdom . |

OTHER PUBLICATIONS

Goldschmidt, C., "Ueber die Einwirkung von Formaldehyd auf Harnstoff", *Ber. dtsch. Chem. Ges.*, vol. 29, pp. 2438-2439 (1896).
Goldschmidt, C., "Ueber die Einwirkung von Formaldehyd auf Harnstoff", *Chemiker–Zeitung*, No. 46, p. 460 (1897).
Dixon, A. E., "Interaction of Formaldehyde and Carbamide", *J. Chem. Soc.*, 113, pp. 238-248 (1918), C.A. 1459 (1918).
Vale, C. P. and Taylor, W. G. K., *Aminoplastics*, Iliffe Books Ltd., London, pp. 22-23 (1964).
Saunders, K. J. *Organic Polymer Chemistry*, Chapman & Hall, London, pp. 304-305.
Reichherzer, R. and Chwala, A., "Condensation Products of Urea and Formaldehyde", 45 Chemical Abstracts 3647(g) (1950).

*Primary Examiner*—Theodore E. Pertilla
*Attorney, Agent, or Firm*—Benoni O. Reynolds

[57] ABSTRACT

A cross-linked urea-formaldehyde polymer matrix is formed by catalyzing, using a buffered acid as the catalyst, an aqueous mixture of a urea-formaldehyde concentrate, urea-formaldehyde resin, and powdered urea. The resulting thermoset polymer which possesses, in part, a cyclic structure, is of unusual hardness and has utility, with or without fillers, as a molding or casting material possessing controllable shrinkage characteristics because of uniform molecular structure and formula versatility.

21 Claims, No Drawings

CROSS-LINKED UREA-FORMALDEHYDE POLYMER MATRIX COMPOSITIONS CONTAINING CYCLIC INTERMEDIATE STRUCTURES

BACKGROUND OF THE INVENTION

This invention broadly relates to urea-formaldehyde polymers. More particularly, this invention relates to thermoset cross-linked urea-formaldehyde polymer matrix compositions and precursors and molding or casting compositions thereof.

Urea-formaldehyde resins are manufactured on a large scale and used in molding compositions, foams for cavity wall insulation, adhesives such as those used in the preparation of plywood, etc. Other amino polymers, somewhat similar to urea-formaldehyde materials, are melamine-formaldehyde polymers. One principal distinction between common urea-formaldehyde polymers and melamine-formaldehyde polymers is that the latter contains cyclic structures. Urea-formaldehyde polymers, on the other hand, are generally of a linear nature. Cyclic structures in polymer compositions have been observed to improve product hardness, strength, heat distortion, and water resistance.

BACKGROUND ART

The reaction of urea with formaldehyde was first noted in 1884, with commercial interest in the polymers commencing at about 1918 with a patent issued to Hanns John (British Pat. No. 151,016). However, in an article authored by Carl Goldschmidt entitled, "On the Effect of Formaldehyde on Urea" (Chemiker-Zeitung, 46, 1897, p. 460), Goldschmidt describes precipitates formed when aqueous solutions of urea and formaldehyde are reacted under acidic conditions. It is believed that the primary precipitate formed by Goldschmidt and empirically identified as $C_5H_{10}O_3N_4$ was, in fact, a cyclically structured condensation product.

The prior art (U.S. Pat. No. 4,224,423) teaches the manufacture of urea-formaldehyde resins where urea and formaldehyde (or formaldehyde derivatives) are reacted in the presence of a urea-formaldehyde resin, with the initial urea-formaldehyde resin becoming a part of the final product when the reaction is completed.

It has been disclosed (U.S. Pat. No. 3,816,376) that a continuous process for the manufacture of amino resin solutions can be obtained by reacting an aqueous pre-condensate urea-formaldehyde resin with urea and formaldehyde in a series of cascade reactors. Another multistage reaction process is set forth in U.S. Pat. No. 3,896,087 wherein urea and formaldehyde are added to a urea-formaldehyde condensate.

The art is aware (U.S. Pat. No. 3,488,310) that urea and formaldehyde are condensed and then additional urea and formaldehyde, plus melamine, are added to produce a final product.

Other references drawn to the reaction of urea and/or formaldehyde in the presence of a urea-formaldehyde component are Japanese Patent Publication No. 55-112227; Japanese Patent Publication No. 55-36231; Japanese Patent Publication No. 54-120659; British Pat. Nos. 543,096 and 403,142; and West German Pat. No. 1570240.

With the exception of the Goldschmidt reference previously discussed, there exists in none of the related prior art any recognition or, apparently, any production of a principal cyclic urea-formaldehyde intermediate product. Using unrelated reaction conditions and reactant ratios, six-membered cyclic structures called "Urons" have been prepared from urea and formaldehyde, but they are not considered to be likely components of Goldschmidt's reaction products.

BRIEF SUMMARY OF THE INVENTION

It is, therefore, an object of the invention to produce an aqueous urea-formaldehyde premix which has a considerable shelf life and is capable of further reaction with urea prior to being thermoset by catalytic agents.

It is a further object of the invention to produce a unique cross-linked urea-formaldehyde polymer matrix containing cyclic structures by the reaction of commonly available urea-formaldehyde resins, urea-formaldehyde concentrates and powdered urea.

It is yet a further object of the invention to provide a practical catalyst system capable of promoting formation of the desired cross-linked urea-formaldehyde polymer matrix, and including particularly, a preferred buffered catalyst agent.

It is another object of the invention to incorporate compatible dyes and fillers so that the cross-linked urea-formaldehyde polymer matrix provides materials with enhanced commercial utility.

It is a still further object of the invention to produce a cross-linked urea-formaldehyde polymer matrix which possesses unusual strength and uniform structure, both filled and unfilled.

It is yet another object of the invention to produce a catalyzed fluid urea-formaldehyde polymer system with unusual molding utility, particularly as a casting liquid subsequently cured at ambient or slightly elevated termperature.

DETAILED DESCRIPTION OF THE INVENTION

According to the present invention, it has now been discovered that a unique cross-linked urea-formaldehyde polymer matrix may be prepared by the carefully controlled combination of urea and formaldehyde adducts to a cyclic reaction product in the presence of a dissolved but partially pre-condensed urea-formaldehyde resin. To produce the useful cross-linked polymer, it is essential that certain component ratios be carefully observed in the preparation of the intermediate product; and similarly critical is the composition and concentrations of the various catalytic agents.

As indicated above, Goldschmidt performed early research which included reacting formaldehyde with urea, the ratio of formaldehyde to urea being 2 to 1. Using hydrochloric acid as the catalyst, insoluble precipitates were produced. Subsequently, A. E. Dixon (J. Chem. Soc. 113, pp. 238–48) performed work similar to that done by Goldschmidt. Dixon determined that using a ratio of 3 moles formaldehyde per 2 moles of urea produced the highest yield of the principal precipitate obtained by Goldschmidt. Although Dixon postulated the formation of a cyclic structure, it is only recently, through work performed by this inventor, that the actual configuration of the primary cyclic material apparently obtained by Goldschmidt and Dixon was elucidated.

The instant invention is concerned with the in-situ formation and reaction of cyclic intermediate materials, including the primary structure discussed above, with a reactive urea-formaldehyde resin to produce a cross-linked urea-formaldehyde polymer matrix. There are several intermediate components required to produce the cross-linked urea-formaldehyde polymer matrix of this invention. Formaldehyde and urea in the form of dissolved methylol ureas must be present in a controlled mole ratio of about 3 to 2 or slightly less. This is conveniently accomplished by dissolving urea, such as in the form of urea prills, in a potentially commercial urea-formaldehyde premix containing both a resin and a concentrate component. Concentrates are commercially available, and the preferred products contain by weight the equivalent of about 60 percent formaldehyde as $CH_2O$ and about 25 percent urea. The commercial urea-formaldehyde resin component is partially condensed and is polyfunctional as concerns methylol (reactive) groups. The urea, usually added in the form of prills, dissolves completely at ambient temperature, and the formaldehyde odor of the mixture then disappears. Presumably, the above occurrence is the result of the effective conversion of free formaldehyde to monomethylol urea and dimethylol urea. Water added in controlled quantity facilitates dissolution of urea without heating and also controls reaction conditions, product viscosity, filler loading capability, etc.

While not wishing to be bound by same, it is believed that the primary structural unit produced by the above reactants is a cyclic unit formed by the condensation of one mole of dimethylol urea with one mole of monomethylol urea, followed by an intramolecular condensation of methylol end groups forming a methylene ether bridge. The reaction rate and product stability are pH sensitive so that a highly buffered catalyst solution is employed for practical process control. The cyclic material, it is believed, has an empirical formula of $C_5H_{10}N_4O_3$ and is represented by the structure set forth below:

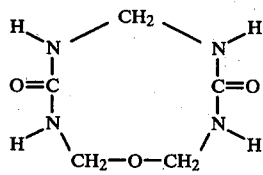

An independent research study sponsored by Chem-Nuclear Systems, Inc. (August, 1980) confirmed that various insoluble, filterable precipitates were formed at room temperature by catalyzing even very dilute aqueous mixtures of urea and commercial urea-formaldehyde concentrate with phosphoric acid buffered by addition of trisodium phosphate. The following analytical data shows that, with sufficient excess of formaldehyde to overcome the dilution effect, the precipitated product asymptotically reached a carbon to nitrogen mole ratio of 1.25, which is in complete agreement (5/4) with the primary Goldschmidt empirical formula, $C_5H_{10}O_3N_4$.

| Mole Ratio of Formaldehyde To Urea in Starting Solution | Mole Ratio of Carbon to Nitrogen in Precipitated Product |
|---|---|
| 1.42 | 1.07 |
| 2.04 | 1.17 |
| 2.70 | 1.25 |
| 3.13 | 1.25 |

Furthermore, it was demonstrated that even the product with the lowest C/N ratio (1.07), which would have the least cyclic structure, showed significantly greater infrared absorption at the 1125 $cm^{-1}$ band than commercial urea-formaldehyde resin power (Urecoll-W, Badische). Methylene ether constituents (—$CH_2$—O—$CH_2$—) would be expected to absorb between 1060 $cm^{-1}$ and 1150 $cm^{-1}$.

It is believed that the cyclic product so produced is predominant during the initial reaction phase and rapidly tends to become insoluble due to intermolecular hydrogen bonding between carbonyl oxygens and imide hydrogens. It is important to note that the development of these complexes magnifies the local concentration of unbonded imide groups, since on average only two of the four imides in each molecule can be bonded to carbonyl oxygens.

It is estimated, based on polymer stoichiometry consistent with the formation of a uniform lattice structure, that hydrogen bonding of cyclic intermediate continues until the average complex has attained a molecular weight equivalent of several thousand. At this point, the mass of the complex and the increasing surface concentration of imide groups causes cross-linking condensations with terminal methylol groups of the urea-formaldehyde resin molecules that have heretofore been merely dispersed in the reacting mixture, and have not significantly reacted with one another due to the buffered pH and the controlled temperature.

It is to be noted that the deliberate use of more urea than required for maximum formation of the cyclic structure will result in a reduced concentration of the ring compound and an excess of monomethylol urea. Being more reactive than the higher molecular weight urea-formaldehyde resin, the excess material condenses with the cyclic complex *first* and thereby modifies matrix properties, particularly shrinkage and porosity. The greater the excess of monomethylol urea, the greater the porosity of the matrix and the least shrinkage. Some shrinkage is necessary, however, for required product strength.

Auxiliary catalysis, induced by the presence of dissolved additives (such as boric acid and glycerol) is thought to promote more complete cross-linking by forming a beneficial acid complex that is, by its borated nature, less prone to decompose ether structures.

It is believed that the natural formulated dilution of the pre-existing urea-formaldehyde resin polymers in the system allows these chains to become disentangled, and exist in least-strained linear positions with their end-group methylols at maximum separation. While the urea-formaldehyde resin represents a variety of molecular chain lengths, the contained smaller and more reactive molecules, such as formaldehyde and methylol ureas, are mostly assimilated during the formation of the cyclic product. Subsequent cross-linking reactions then establish uniform spatial distance between adjacent hydrogen-bonded cyclic complexes in the cured state. Under such structural conditions, the matrix formed may be more highly ordered than in other three-dimensional condensation polymers. This allows residual water modecules to later traverse vast molecular distances throughout the cured lattice with relative ease, and then evaporate to allow uniform, unstrained contraction of the matrix to an irreversibly rigid state.

It is essential that the cyclic condensation product is formed in situ, that is, in the presence of the urea-formaldehyde resin. It does not appear possible, as is far as is known, to redisperse and effectively react the insoluble cyclic product, once large aggregates, i.e., visible precipitate, are produced.

The urea-formaldehyde polymer system described thus far produces cured objects that without added fillers shrink up to 10-11 percent along all linear dimensions, and as much as 25-30 percent volumetrically. Shrinkage, which is much more uniform than in other polymer systems, may be controlled by introducing particulate fillers and/or varying the amount of urea used to prepare the casting liquid. As the weight of urea is increased from 33 parts to 40 parts per 100 parts of premix liquid, ultimate shrinkage is substantially reduced. The increased urea is believed to reduce the concentration of cyclic complex and modify its hydrogen bonding capability during evaporation of moisture. The ability to tailor shrinkage by urea formulation permits a degree of customized control of product behavior to suit individual casting applications.

The appropriate selection of fillers, particularly finely-ground materials, such as inorganic oxides, that will hydrogen bond to residual imide groups, will help to produce matrices with great mechanical strength and diminished shrinkage.

Tests indicate that filler loadings occupying about 20-30 percent of the volume for freshly cured casting are particularly beneficial for control of shrinkage and improved product toughness. The incompressible filler particles eventually resist continued contraction and induce uniform microporosity known to improve crack resistance in other systems.

Since all polymer constituents and catalytic agents are initially water soluble, the selection of colorants for castings ranges from finely divided, dispersible pigments to water soluble dyes. Food grade dyes may be used effectively, but most of these components are not resistant to UV light. Castings that inherently develop microporosity by deliberate formulation will produce pastel color effects by addition of water soluble dyes.

The catalyst system employed in the production of the cross-linked urea-formaldehyde polymer matrix is a buffered acid type and is not particularly low in pH. A preferred catalyst is a mixture of phosphoric acid and an equal weight of trisodium phosphate dodecahydrate, the above components being mixed with water. The selection of components which comprise the catalyst system must control the reaction rate so that the material does not react too quickly to provide for the manufacture of cast articles, but provide sufficient catalytic action necessary to cause a thorough reaction of the components, yet not cause the post decomposition of sensitive ether structures. Powdered boric acid and glycerol are added separately to the urea-formaldehyde liquid to be cross-linked, preferably prior to the addition of the main (buffered) catalyst solution.

A typical buffered catalyst system contains two parts each of a 75 percent phosphoric acid and trisodium phosphate dodecahydrate, and one part water. Separately, equal amounts of glycerol and boric acid are added to the urea-formaldehyde liquid to be cured so that the ratio of glycerol and boric acid to the phosphoric acid-trisodium dodecahydrate-water component is about 1:1.5. The boric acid and glycerol (as well as other 1,2-diols) produce unique acid complexes, and boric acid is known to stabilize certain ether structures. It is believed that the compound catalyst system so described itself constitutes invention and may be used for the polymerization or cure of other urea-formaldehyde or polymeric condensation systems. It is not intended that the embodiment just described is to be limiting in any sense, it being one of several alternative embodiments.

As previously stated, the cross-linked urea-formaldehyde polymer matrix is formed from a casting liquid formulated by blending urea-formaldehyde resin, urea in the form of prills, and a urea-formaldehyde concentrate mixture. Additional water and agents to control pH, such as alkanolamines, particularly triethanolamine, may also be added if not already present in the commercial urea-formaldehyde liquids. The system is agitated to provide a uniform blend of materials and to help dissolve the urea. Moderate or intermittent agitation is continued until all urea has dissolved and the blend no longer has a formaldehyde odor. Several hours may elapse until this condition is reached. Ideally, the pH will be about $7.6 \pm 0.2$. If the pH is below this figure, triethanolamine or other suitable base may be employed to raise it to the appropriate level. Should the pH be too high, dilute acetic acid or other eqivalent material is employed to correct the pH values downward.

During the blending of the components, the temperature initially drops as the urea dissolves endothermically in the aqueous solution. It will gradually rise, however, due to the exothermic reaction involved with the formation of mono- and dimethylol ureas.

The storage stability of the above-described mixture is limited, and it should be used within about two weeks of preparation. If the urea, introduced in the form of prills, is withheld from the mixture, the remaining blend (premix) of liquid ingredients has a long or even indefinite shelf life.

When the buffered catalyst system is added to the properly formulated urea-formaldehyde casting liquid, reactions occur which produce cyclic products followed by cross linking reactions between the cyclic intermediate complexes and the urea-formaldehyde resin present in the blend. It is noted that should the urea-formaldehyde resin not be present, no desirable cross linking will occur. Any free formaldehyde present will partially cross-link the cylic complex but result in extreme shrinkage and poor strength.

The addition of fillers or other components may be made prior to (preferable) or after the addition of the catalyst system. The system is agitated so as to provide a uniform mixture. If the filler is added after the catalyst, it must be done sufficiently early so that thickening has not advanced to the point where blending becomes difficult. Similarly, casting is performed before the reaction gets to the stage where the pouring of the mixture and optional vacuum de-gassing is prohibited because of too high a viscosity.

Larger-sized castings may be cured at room temperature or in an oven. If an oven is employed for curing, usually for smaller castings, temperatures of about 100-125 degrees Fahrenheit are preferred. Duration of cure is usually from about 24 to 48 hours. During the period of cure, it is important that the molding or casting be in a completely filled, sealed container so that there is no evaporation of water during the curing process. The objects are then allowed to cool to ambient temperature before being unsealed.

The selection of the filler material is very important in that the filler selected should not react with the catalyst or interfere with the formation of the cross-linked urea-formaldehyde polymer matrix. Typical particulate fillers capable of being used are silica, silica-flour, magnetite, aluminum oxide, cotton flock, metallic powders such as lead and aluminum, wood-flour, fiberglass, glass, etc. Mixtures of these fillers can also be employed. The amount of filler which can be added to the system varies greatly and directly affects the apparent density, degree of shrinkage, and strength of the cast article. The particle size of the filler materials must be controlled, since larger particles tend to settle out before cure, and very fine particles have high surface area that inhibits smooth release of residual moisture. Typically, a 20–30 micron particle is favored.

It is particularly noteworthy that the cyclic intermediate cannot be formed as a separate component and then have added thereto urea-formaldehyde resin so as to form a cross-linked polymeric network. The system must be configured so that the cyclic condensation product is formed in situ after the catalyst is added to the system and, as precipitation occurs, the desired cross-linked urea-formaldehyde polymer matrix is then produced.

The storage stability of the casting liquid may be extended by using higher water concentrations; however, care must be taken so as not to significantly dilute the uncatalyzed resin. The addition of too much water to the system may produce a brittle, porous end product which lacks the characteristic shrinkage and final hardness obtained with a properly balanced formula.

Although urea-formaldehyde polymers are customarily employed in the production of the cross-linked urea-formaldehyde polymer matrix, this invention is not limited thereto. Other systems which are water soluble and polyfunctional toward the cyclic intermediate product can be substituted in place of the urea-formaldehyde resin. Glyoxal (usually as the 40% solution), although somewhat more difficult to control in terms of the manufacturing process, is an example of a polyfunctional material capable of being used in place of conventional urea-formaldehyde resins. The preferred products of this invention, moreover, will, exclusive of fillers, contain at least about 25 percent by weight of the cyclic intermediate structure relative to the total casting weight including cross-linking agent.

The urea-formaldehyde concentrate, which constitutes one of the components necessary in the preparation of the cross-linked polymer matrix, can be any of several commercially available products. For instance, Casco CR-4 (Borden Chemical) or GP-5326 (Georgia Pacific) are typical of commercially available concentrates and normally contain about 60 percent $CH_2O$ and 25 percent urea.

Urea-formaldehyde resins suitable for use in the instant system are heat reactive materials and include such resins as Resin Bond 813 (Southern Resin); Casco CR-2 (Borden Chemical); or GP-1988 (Georgia Pacific). Obviously, other similar urea-formaldehyde resins may, of course, also be employed. A preferred combination of resins would include a blend of Casco CR-4 as the urea-formaldehyde concentrate and Casco CR-2 as the urea-formaldehyde resin.

The compositions of this invention contain 10–50 weight percent of urea-formaldehyde components based on a combined weight of urea-formaldehyde resin and urea-formaldehyde concentrate, with 20–40 weight percent being preferred and 30 percent being the most preferred.

The weight parts of added water to 100 parts of urea-formaldehyde resin and concentrate mixture are from 5–25, with 10–20 being preferred and 15 being most preferred.

For casting formulations of this invention not requiring urea-formaldehyde resin as cross-linking agent, the weight ratio of urea added to the balance of the formula may vary but will always produce in situ some expected intermediate cyclic structures containing or derived from the compound of empirical formula $C_5H_{10}O_3N_4$.

The casting liquid compositions of this invention are formulated with a weight ratio of urea to most preferred premix liquid of 0.28 to 0.43, with a range of 0.33 to 0.40 being most preferred.

The preparation of the catalyzed system is usually initiated at room temperature, i.e. 70 degrees Fahrenheit. While the ambient temperature may vary, it is important that the reaction not proceed so quickly that, because of a high viscosity, it is difficult to cast or mold the composition.

Silica or silica flour may also be used as filler modifiers of the cross-linked urea-formaldehyde polymer matrix to produce castings of unusual strength and a low percentage of volumetric shrinking. When a casting is made containing about 40–60 parts by weight silica particles per 100 parts of casting liquid, after-shrinkage is much less than would be anticipated considering the urea content of the casting liquid and known volume of the filler. Measurements of volume change versus weight loss have shown that microporosity is induced by the eventual resistance of the filler particles to continued shrinkage. Controlled microporosity is known to be beneficial in concrete compositions, and in specialty silica materials acts as a "crack-stopper" to effectively double transverse rupture strength. Commercial silica flours in the 15–30 micron range are considered most suitable for these high loadings.

As set forth previously, the cross-linked urea-formaldehyde polymer matrix compositions of this invention have particular utility when molded or cast with various fillers. When magnetite is the filler of choice, molded or cast objects can be produced which are very effective as shielding materials against certain levels of radiation. Also, the use of magnetite powder with the urea-formaldehyde composites of this invention will produce materials which, while electrically non-conducting, demonstrate impressive toughness and iron-like attraction to permanent magnets. When using magnetite, it is possible to produce plastic compositions which from a weight consideration have high mineral loadings and utilize a low cost binder.

A typical casting employing magnetite as a filler is constituted as follows:

| Ingredient | Weight Percent |
| --- | --- |
| Magnetite powder | 54.2 |
| Silica flour, 5 micron range | 4.1 |
| Urea-formaldehyde casting liquid | 40.7 |
| (ratio of urea to premix liquid = 0.43) | |
| Boric acid powder | 0.2 |
| Glycerol | 0.2 |
| Buffered Catalyst* | 0.6 |

*Dissolved mixture of 100 parts 75 percent phosphoric acid, 100 parts tri-sodium phosphate dodecahydrate, and 50 parts tap water.

The ingredients in the above composition would be thoroughly blended, cast into a mold, sealed and cured overnight at a temperature of about 115–120 degrees Farenheit. Simple, smooth walled plastic molds may be used without the necessity of mold release agents. The size of the mold will vary, since substantially large castings may be required for acceptable radiation shields. Heavy castings containing magnetite exhibit remarkable toughness, usually denting when struck by a direct blow rather than cracking. Castings made from such a material also exhibit only modest shrinkage (2-4%).

Aluminum oxide power may also be incorporated into the cross-linked urea-formaldehyde polymer matrix. Castings made from such a composition might take the form of lightweight moving parts, such as gears, with unusual resistance to wear.

As previously mentioned, other fillers, such as lead and aluminum powders, wood-flour and glass may be formulated into the cross-linked urea-formaldehyde polymer matrix, the sole requirement being that no reaction which adversely affects the preparation and curing of the composition be present.

EXAMPLE 1

The following ingredients were blended together in a laboratory container to prepare a batch of casting liquid.

Urea-Formaldehyde Concentrate, Borden CR-4: 700 Grams;
Urea-Formaldehyde Resin, Borden CR-2: 300 Grams;
Water: 150 Grams;
Urea Prills, Commercial Grade: 420 Grams.

After intermittent agitation for a period of about 12 hours, all urea had apparently dissolved. After 24 hours, the opalescent solution no longer smelled of formaldehyde. Four days later, a portion of the casting liquid was catalyzed as follows:

Casting Liquid: 440 Grams;
Glycerol: 8.8 Grams;
Buffered Catalyst*: 4.4 Grams;
Red Food Coloring Solution: 0.5 Gram.

*A solution of 100 parts 75% $H_3PO_4$, 100 parts $Na_3PO_4.12H_2O$ and 50 parts water.

The thoroughly blended catalyzed mixture was poured into two identical 150 ml. plastic containers so that the vessels were completely filled before affixing tight plastic caps. One sealed container was placed in an oven at 100 degrees Fahrenheit for 45 hours, while the other sealed container remained at ambient (75 degrees Fahrenheit) temperature. After allowing the heated sample to cool to ambient temperature, both vessels were unsealed. The heat cured casting was easily removed from the container, and about 2.4 grams of watery fluid was between the casting and the sides of the vessel. The room temperature casting was more difficult to extract and had only about 0.2 grams of separated fluid. Twenty-two hours later the heat-treated casting had shrunk linearly about 4% and was free of cracks. The room temperature casting did not measurably shrink, but was thoroughly cracked. After eight more days the uncracked casting had shrunk 7% uniformly in all linear dimensions. The estimated volumetric contraction in cubic centimeters closely matched the measured weight loss in grams. After four weeks the casting had stabilized at about 10% linear contraction and withstood without failure a compressive load of 10,000 pounds applied for 10 minutes in a Carver testing press. After 15 months at room temperature, the casting did not crack or show surface oxidation effects (crazing, etc.). The color remained uniform red with slight translucency.

EXAMPLE 2

The following ingredients were blended together in a laboratory container to prepare a batch of casting liquid.

Premix Composition**: 1150 Grams;
Urea Prills, Commercial Grade: 420 Grams.

**A specially prepared commercial liquid containing 70 parts urea-formaldehyde concentrate (Georgia Pacific 5326), 30 parts urea-formaldehyde resin (ResinBond 813), and 15 parts water.

The above mix formed a uniform fluid as in Example 1, and after three days the following silica-filled casting formulas were prepared:

|  | MIX 1 | MIX 2 | MIX 3 | MIX 4 | MIX 5 |
|---|---|---|---|---|---|
| Casting liquid | 200 Gm. | 200 Gm. | 200 Gm. | 200 Gm. | 200 Gm. |
| Boric Acid Powder | 1.0 Gm. | 1.0 Gm. | 1.0 Gm. | 1.0 Gm. | 1.0 Gm. |
| Glycerol | 1.0 Gm. | 1.0 Gm. | 1.0 Gm. | 1.0 Gm. | 1.0 Gm. |
| Silica Flour (Pittsburgh Glass Sand Co.) | 40 Gm. (10 Micron) | 80 Gm. (30 Micron) | 120 Gm. (15 Micron) | 160 Gm. (30 Micron) | 160 Gm. (5 Micron) |
| Buffered Catalyst (as in Example 1) | 3.0 Gm. | 3.0 Gm. | 3.0 Gm. | 3.0 Gm. | 3.0 Gm. |

All formulations were mixed thoroughly and then sealed as in Example 1 in the same size containers. Cure was accomplished in 28 hours in an oven maintained at 115–120 degrees Fahrenheit. Castings 1 through 4 did not crack after removal from the containers or after dying to constant weight. Casting 5 was not able to shrink at the same rate as the other castings, and cracked within 24 hours. The equilibrium linear shrinkage of the remaining samples vs. weight percent silica on original casting liquid is as follows: It is to be noted that the shrinkage at higher silica loadings is much less than would be expected considering the modest changes in the volume percent of casting liquid in the formulas at these higher loadings.

| Weight Percent Silica | Volume Percent Casting Liquid | Ultimate Linear Shrinkage |
|---|---|---|
| 20 | 91.1 | 7.7% |
| 40 | 83.7 | 6.1% |
| 60 | 77.4 | 4.6% |
| 80 | 71.9 | 3.6% |

EXAMPLE 3

The following three casting liquid formulas were prepared as in Example 2 and contained different levels of urea as shown.

|  | Formula 1 | Formula 2 | Formula 3 |
|---|---|---|---|
| Premix (as in Ex. 2) | 230 Gms. | 230 Gms. | 230 Gms. |
| Urea Prills | 70 Gms. | 84 Gms. | 98 Gms. |

After six days the casting liquid formulas were identically filled and catalyzed in the following mixture:

Casting Liquid (All Formulas): 200 Gms.
Boric Acid Powder: 1.0 Gms.
Glycerol: 1.0 Gms.
Magnetite Powder (St. Joe): 380 Gms.
Silica Flour, 5 Micron (PGS): 20 Gms.
Buffered Catalyst (as in Example 1): 3.0 Gms.

The three formulations were mixed and then cast in sealed containers as in Example 1. Cure was accomplished in 24 hours in an oven maintained at 115-120 degrees Fahrenheit. All castings were difficult to extract from the plastic containers, and noticeable cracking appeared during several days of drying. A later casting mix of Formula 3 with Magnetite reduced to 267 grams was readily removed from the container after cure and did not subsequently crack. The significance of the urea content of the casting liquid on the shrinkage and appearance of the three original castings is indicated in the following table:

|  | Formula 1 | Formula 2 | Formula 3 |
|---|---|---|---|
| Ultimate Linear Shrinkage | 4.4% | 3.8% | 2.2% |
| Degree of Cracking | Severe | Moderate | Slight |
| Surface Rugosity | Dull | Smooth | Polished |

EXAMPLE 4

The casting liquid described in Example 2 was formulated as in Mix 4 of the same example, but substituting for silica flour some powdered synthetic aluminum oxide (Norton Alundum 500-32B). A uniform casting was produced after 24 hours cure at 115-120 degrees Fahrenheit that later could be cut with a hacksaw, but only with great difficulty. The matrix also resisted abrasion with fine sandpaper.

EXAMPLE 5

The casting liquid described in Example 2 was formulated with powdered iron (Reagent Grade) as in Mix 2 of the same example. Mixing and casting proceeded normally, but after sealing and placement in a 115-120 degree Fahrenheit oven, gas evolution was noted and the test was discontinued.

EXAMPLE 6

The casting liquid described in Example 2 was formulated with about 2% by weight aluminum powder filler (Paint Grade). The casting was cured for 24 hours at 115-120 degrees Fahrenheit, shrank normally, and retained a dull metallic aluminum color on all surfaces.

EXAMPLE 7

The casting liquid described in Example 3, Formula 3, was formulated with commercial wood flour using 10 parts filler per 100 parts casting liquid. Catalyst addition included 0.5 part each of boric acid power and glycerol, and 1.25 parts of buffered catalyst as in Example 1. Mixing produced a smooth, batter-like liquid that was readily cast. Cure was accomplished in an oven at 115-120 degrees Fahrenheit for 24 hours. After cooling to ambient temperature, the mold was unsealed and the part removed. The dried object was hard, had a wood-like color, and could be sawed, sanded and polished.

While the present invention has been described by reference to specifics, it should be understood that the present invention is in no way deemed as limited thereto, but should be construed only as exemplary, as a wide variety of embodiments may be devised without departing from the spirit and scope of the invention.

What is claimed is:

1. A process for producing a cross-linked urea-formaldehyde polymer matrix composition which comprises forming a fluid mixture of:
   (a) a urea-formaldehyde resin;
   (b) a liquid urea-formaldehyde concentrate;
   (c) powdered or prilled urea; and
   (d) water;
   agitating the mixture until complete dissolution of the solid urea has occurred and the mixture is substantially free of formaldehyde odor;
   adding sufficient catalyst to the mixture to produce a controlled set to form a cross-linked urea-formaldehyde polymer matrix.

2. The process of claim 1 wherein the catalyst comprises a buffered acid.

3. The process of claim 2 wherein the catalyst comprises a buffered phosphoric acid.

4. The process of claim 3 wherein the phosphoric acid catalyst comprises phosphoric acid, tri-sodium phosphate and water.

5. The process of claim 4 wherein up to one percent boric acid and up to three percent glycerol are additionally added to the mixture.

6. The process of claim 5 wherein the catalyst comprises by weight 100 parts of 75 percent phosphoric acid, 100 parts tri-sodium phosphate dodecahydrate and 50 parts water.

7. The process of claim 1 wherein the urea-formaldehyde concentrate contains about 60 percent formaldehyde and 25 percent urea.

8. The process of claim 1 wherein the urea-formaldehyde resin comprises about 6-30 percent of the mixture, added water constitutes about 3-15 percent of the mixture, and the weight of solid urea to the balance of the mixture is about 28 to 43 parts per 100.

9. The process of claim 1 wherein the solid urea is in the form of urea prills.

10. A process for producing a cross-linked urea-formaldehyde polymer matrix composition which comprises:
   (A) forming a mixture of:
      (1) a liquid urea-formaldehyde concentrate containing about 60 percent formaldehyde and about 25 percent urea;
      (2) a reactive liquid urea-formaldehyde resin containing about 65 percent solids; and
      (3) water;
   (B) agitating the mixture to obtain a uniform blend; and then
   (C) adding urea prills to said mixture and continuing agitation for a period of time sufficient to dissolve said urea and to allow for the formation of monomethylol urea and dimethylol urea in the ratio required; and
   (D) adding a sufficient amount of a buffered phosphoric acid catalyst, said catalyst comprising phosphoric acid, tri-sodium phosphate dodecahydrate and water, said catalyst being used in conjunction with a component selected from the group consisting of glycerol, boric acid and mixtures thereof, said catalyst initially causing a primary cyclic ring structure corresponding to the formula $C_5H_{10}N_4O_3$ to be formed and then causing by further reaction the formation of a hard, cross-linked urea-formaldehyde polymer matrix material.

11. The process of claim 10 wherein the urea-formaldehyde resin constitutes about 6–30 percent of the pre-catalyzed mixture, water constitutes about 3–15 percent of the pre-catalyzed mixture, and the weight of solid urea to the balance of the formula is about 28 to 43 parts per 100.

12. The process of claim 1 which additionally contains an additive selected from the group consisting of a filler, a dye and a pigment or mixtures thereof wherein 1.0 to 200 parts of said filler are added per 100 parts of the mixture.

13. The process of claim 12 wherein the filler is selected from the group consisting of aluminum oxide, silica, silica flour, magnetite, wood-flour and mixtures thereof.

14. The process of claim 1 wherein a filler is added prior to, or subsequent to, the addition of the catalyst.

15. The process of claim 1 wherein the catalyzed composition is cast in a mold.

16. The process of claim 15 wherein the mold is a sealed mold.

17. The process of claim 10 wherein the cyclic ring structure initially formed constitutes at least 25 percent by weight of the final cross-linked urea-formaldehyde polymer matrix.

18. The process of claim 15 wherein the mold is cured at temperatures up to 125 degrees Fahrenheit for a period of up to 48 hours.

19. The product produced by the process of claim 1, 2, 3, 4, 5, 6, 7, 8, 9, 10, 11, 12, 13, 14, 15, 16, 17, or 18.

20. A composition which can be used to produce a cross-linked urea-formaldehyde polymer matrix which comprises a mixture of
    (a) a urea-formaldehyde resin;
    (b) a liquid urea-formaldehyde concentrate;
    (c) urea; and
    (d) water.

21. A process for producing a cross-linked polymer matrix where the primary intermediate structure is a urea-formaldehyde compound, cyclic in nature and corresponding to the empirical formula $C_5H_{10}O_3N_4$, which forms and reacts in situ with a polyfunctional substance selected from the group consisting of urea-formaldehyde resin having two or more methylol groups per mole, glyoxal, or other suitable reactive soluble agent, comprising:

forming a fluid mixture of:
   (a) said polyfunctional substance;
   (b) a liquid urea-formaldehyde concentrate;
   (c) powdered or prilled urea; and
   (d) water;

agitating the mixture until complete dissolution of the solid urea has occurred and the mixture is substantially free of formaldehyde odor; and adding sufficient acid catalyst to cause formation of said intermediate and further reaction of said intermediate with said polyfunctional substance to form a hard, cross-linked urea-formaldehyde polymer matrix.

* * * * *